(12) United States Patent
Baughman et al.

(10) Patent No.: US 8,718,824 B2
(45) Date of Patent: May 6, 2014

(54) CO-EVOLUTIONARY PRODUCT OPTIMIZATION

(75) Inventors: Aaron Keith Baughman, Silver Spring, MD (US); Peter K. Malkin, Ardsley, NY (US); Arnold Greenland, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 12/797,346

(22) Filed: Jun. 9, 2010

(65) Prior Publication Data

US 2011/0305803 A1 Dec. 15, 2011

(51) Int. Cl.
*G05B 21/00* (2006.01)

(52) U.S. Cl.
USPC .............................. 700/266; 700/28

(58) Field of Classification Search
USPC .................................. 700/28, 266
See application file for complete search history.

(56) References Cited

U.S. PATENT DOCUMENTS

| | | | |
|---|---|---|---|
| 5,148,513 A * | 9/1992 | Koza et al. | 706/13 |
| 6,882,988 B2 | 4/2005 | Subbu et al. | |
| 7,299,202 B2 | 11/2007 | Swanson | |
| 7,430,477 B2 | 9/2008 | Selifonov et al. | |
| 2004/0067534 A1 | 4/2004 | Delagrave | |

OTHER PUBLICATIONS

IBM, "A Method to Identify the Defect Trend Within a Product Life-Cycle", IP, COM/IBM TDB, Dec. 19, 2002.
Li, "Evolutionary Optimization Methods for Mass Customizing Platform Products"; Dialog/Dissertation Abstracts, vol. 69/11-B, p. 7069, 2008.
Brabazon et al., "Agent-Based Modeling of Product Invention", ACM Digital Library, pp. 129-140, Jun. 2005.
Popovici et al., "Monotonicity Versus Performance in Co-optimization", ACM Digital Library, pp. 151-160, Jan. 2009.
Monroy et al., "Coevolution of Neural Networks Using a Layered Pareto Archive", pp. 329-339, Jul. 2006.
Li et al., "Coevolutionary Feature Synthesized EM Algorithm for Image Retrieval", ACM Digital Library, pp. 696-710, Nov. 2005.

* cited by examiner

*Primary Examiner* — Jyoti Nagpaul
(74) *Attorney, Agent, or Firm* — Douglas A. Lashmit; Hoffman Warnick LLC

(57) ABSTRACT

A system, method and program product for enhancing individualized and safe food production using an iterative co-evolutionary approach. A system is disclosed that includes a production system for generating a set of end products based on an inputted set of host chromosomes and a parasite chromosome (which may include machine/human contaminants); an evaluation system for evaluating each end product; an evolution system for generating a set of evolved host chromosomes and an updated parasite chromosome; and a mechanism for generating a further set of end products based on the evolved host chromosomes and the updated parasite chromosome.

22 Claims, 3 Drawing Sheets

| HOST CHROMOSOME  50 |
|---|
| <NAME> Hamburger_version_1 |
| <INGREDIENTS> |
|    <1> ¼ pound generic beef patty |
|    <2> sliced whole wheat bun |
|    <3> 2 pickle slices |
|    <4> 1 ounce ketchup |
|    <5> 1 ounce mustard |
|    <6> 1 ounce lettuce |
|    <7> 1 ounce chopped onion |
| < PRODUCTION > |
|    <1> Open flame |
|    <2> Temp = 500 degrees F |
|    <3> 4 minutes each side |
| < PACKAGING> |
|    <1> Wrapped in 8"x8" Foil |
| < ANTIBIOTICS> |
|    <1> Beef Treatment |
|    <2> Lettuce Treatment |
|    <3> Bread Treatment |

| PARASITE CHROMOSOME  52 |
|---|
| <PARA_1> E_coli |
| <PARA_2> Larvae |
| <PARA_3> Streptococcus |
| <PARA_4> Fungi |
| <CONTAMINANTS> |
|    <1> Plastic |
|         <error_rate> 0.02 |
|    <2> Paper |
|         <error_rate> 0.0001 |

FIG. 2

CO-EVOLUTIONARY PRODUCT OPTIMIZATION

BACKGROUND

The present invention relates to providing customized products for consumers while eradicating contaminants, and more specifically for providing customized food products using a co-evolutionary process involving a host/parasite paradigm.

In many industries, such as the food industry, businesses want to provide sterile and safe customized products for their consumers. In some cases this may involve tailoring products for individuals or groups of individuals. For instance, different geographic regions may have different taste preferences that food producers need to assimilate into variations of a food product. For example, people from one geographic region may typically prefer mustard and ketchup on a hamburger, while people from another geographic region may typically prefer just ketchup. Moreover, such preference may change over time as population and attitudes shift. In addition, each region has varying viruses, parasites and contaminants that gradually evolve over time. Much like the flue virus vaccines, the product environment must change.

Currently, there is little ability for businesses to rapidly interpret personalized requirements and deliver customized products efficiently, safely and on an economy of scale.

BRIEF SUMMARY

The present disclosure describes a system and method for producing food products that utilizes an iterative co-evolutionary approach. The co-evolutionary approach involves a host/parasite paradigm adapted to produce individualized products while eradicating contaminants such as bacteria. Product qualities, such as smell, taste, texture, freshness, etc., are ensured before distribution. The production process can be modified to match specified changes in the characteristics of a given product.

According to one embodiment of the present invention, a system for enhancing food production is provided, comprising: a production system for generating a set of end products based on an inputted set of host chromosomes and a parasite chromosome; an evaluation system for evaluating each end product; an evolution system for generating a set of evolved host chromosomes and an updated parasite chromosome; and a mechanism for producing a further set of end products based on the evolved host chromosomes and the updated parasite chromosome.

According to another embodiment of the present invention, a method for enhancing food production is provided, comprising: producing a set of end products based on a set of host chromosomes and a parasite chromosome; evaluating each end product; generating a set of evolved host chromosomes and an updated parasite chromosome; and producing a further set of end products based on the evolved host chromosomes and the updated parasite chromosome.

According to a further embodiment of the present invention, a computer readable medium having a computer program product stored thereon for enhancing food production is provided, which when executed by a computer system, includes: program code for facilitating production of a set of end products based on a set of host chromosomes and a parasite chromosome; program code for evaluating each end product; program code for generating a set of evolved host chromosomes and an updated parasite chromosome; and program code for generating a further set of end products based on the evolved host chromosomes and the updated parasite chromosome.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings.

FIG. 2 depicts a host and parasite chromosome in accordance with an embodiment of the invention.

Figure 1:
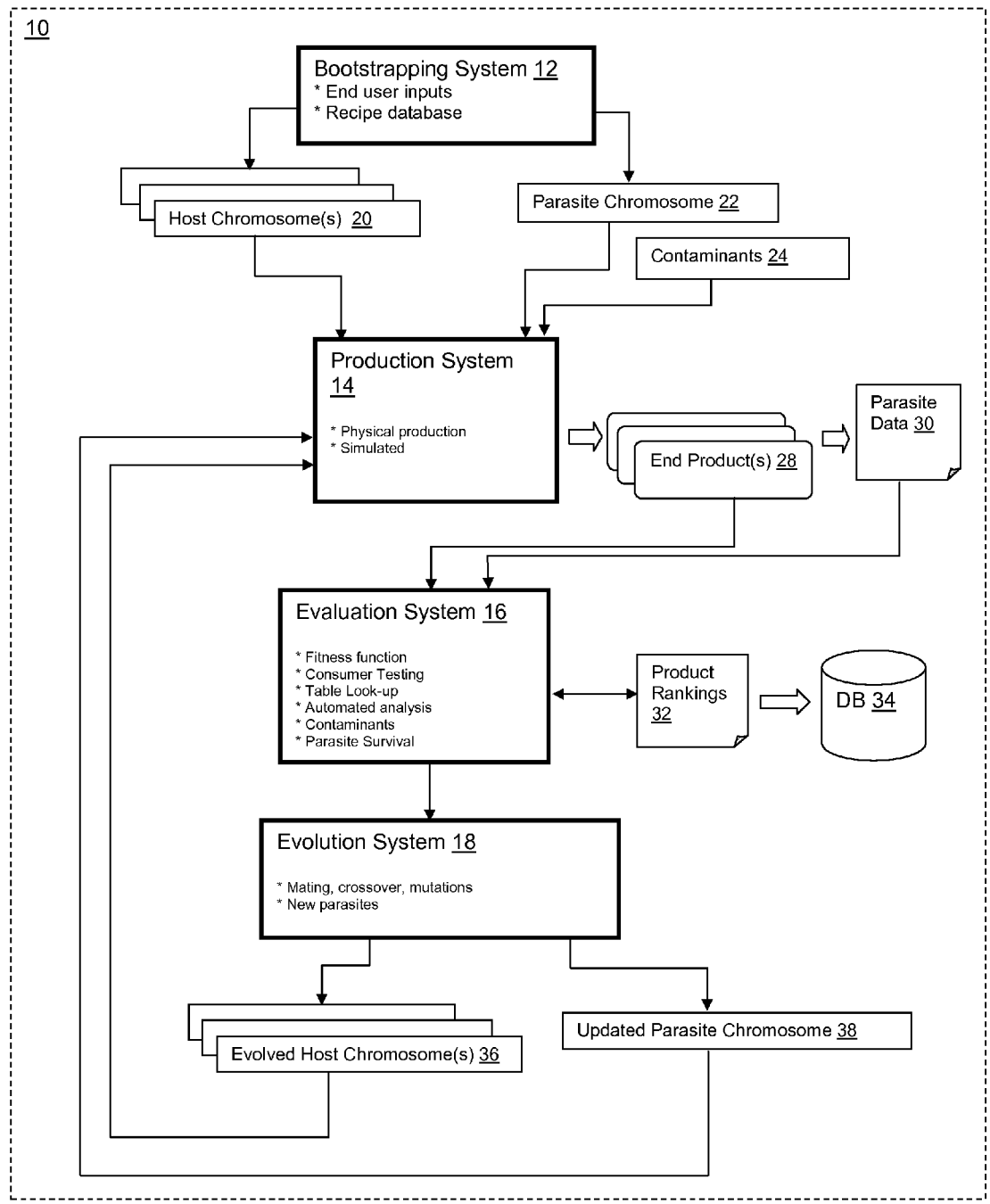
FIG. 1 depicts co-evolutionary system in accordance with an embodiment of the invention.

The drawings are merely schematic representations, not intended to portray specific parameters of the invention. The drawings are intended to depict only typical embodiments of the invention, and therefore should not be considered as limiting the scope of the invention. In the drawings, like reference numbering represents like elements.

DETAILED DESCRIPTION

FIG. 1 depicts an illustrative co-evolutionary system 10 that models a host/parasite paradigm to improve production performance of food products. For the purposes of this disclosure, a food product may comprise any consumable item, e.g., a hamburger, a beverage, ice cream, fruits and vegetables, an alcoholic beverage, cereal, eggs, a restaurant meal, frozen foods, etc.

Within co-evolutionary system 10, a food product is encoded into a host chromosome 20, which is essentially a recipe for producing an end product 28. Each host chromosome 20 may include any number of elements or data vectors, e.g., ingredients, preparation instructions, cooking temperatures, etc., required by a production system 14 to produce the end product 28. Co-evolutionary system 10 utilizes an iterative/feedback approach that causes host chromosome(s) 20 to evolve after each production run, thus enhancing the end product(s) 28.

Co-evolutionary system 10 also incorporates the use of a parasite chromosome 22, which encodes one or more parasites that could potentially get introduced into the production system 14, and thus impact the quality of the end product(s) 28. Illustrative parasites may include any type of parasitic creature or substance, e.g., bacteria, mold, insects, etc. In addition, contaminants 24 may also be introduced into the production system 14 in order to determine the contaminant's impact on the quality of the end products(s) 28. Contaminants 24 may include any human or machine error, such as a foreign substance that could be inadvertently introduced, e.g., plastic, oil, paper, etc. In one illustrative embodiment, contaminants 24 may include a percent value or other function that determines how often a contaminant 24 is likely to be introduced. Contaminants 24 may be included in the parasite chromosome 22, or be introduced to the production system 14 as a separate input.

An illustrative operation of the co-evolutionary system 10 is as follows. Initially, a set of host chromosome(s) 20 and a parasite chromosome 22 for a food product are generated and encoded by a bootstrapping system 12. The initial host chromosome(s) 20 and a parasite chromosome 22 may be generated in any manner. In one illustrative embodiment, a set of end user inputs may be used to help construct the initial set of host chromosome(s) 20. The user inputs may be entered through an interface that queries the user for details or preferences of a food product. For instance, a user may enter "ice cream with cherries," "crunchy colorful cereal," "strong coffee," etc. Using information parsed from the user inputs, along with information from, e.g., a food product/recipe database a starting set of host chromosome(s) 20 can be encoded.

A plurality of different host chromosome(s) 28 may be generated to provide a set of complete yet varying recipes, e.g., one recipe for cherry ice cream may utilize heavy cream while another uses whole milk, one may use whole cherries while another user sliced cherries, etc. The initial parasite chromosome 22 and contaminants 24 may likewise be generated in any fashion, e.g., based on a database of known parasites for a give food product.

Once generated, the host chromosome(s) 20 and parasite chromosome 22 are submitted to a production system 14 to generate end product(s) 28, e.g., a carton of cherry ice cream. Each host chromosome 20 triggers the production of an associated end product 28. Accordingly, if n host chromosome(s) are initially generated by bootstrap system 12, then production system 14 should produce n different end product variants. Production system 14 may comprise a physical production line for producing physical end product(s) 28, or a simulated production line for generating simulated end products(s) 28.

In addition to the creation of the end product(s) 28, parasite data 30 may also generated. Parasite data 30 represents information about any resulting impact the parasites encoded in parasite chromosome 22 have on the end product(s) 28. For example, depending on the ingredients and production process, a given parasite may or may not survive. Accordingly, the parasite data 30 for a first end product variant may differ from the parasite data 30 of a second end product variant.

Once the end product(s) 28 and parasite data 30 are generated by production system 14, they can be entered into evaluation system 16. Evaluation system 16 evaluates, e.g., ranks and/or scores each end product variant using any now known or later developed evaluation technique. In one illustrative embodiment, a fitness function may be utilized to rank an overall quality of each variant. In another embodiment, consumer testing may be utilized to determine which variant is preferred. In yet another embodiment, an automated analysis may be utilized, e.g., using spectroscopy that measures chemical shifts, analyzes visible images such as color, shape, size, texture, and identifies biomarkers to provide chemical velocity and acceleration. In addition, resulting contaminants and parasite data 30 can be incorporated into the analysis. A set of product rankings 32 can be generated, and in some cases be saved in a database (DB) 34 for future use by evaluation system 16.

Once each of the end product(s) 28 is evaluated, evolution system 18 can be employed to genetically evolve one or more host chromosome(s) 20 associated with the best/highest ranking end product(s). For instance, assume there were four initial host chromosomes 20 representing four different recipes for cherry ice cream, which were used to produce four different cherry ice cream variants. Based on an analysis of evaluation system 16, assume two of the variants ranked as superior while the other two variants were ranked as inferior. The two host chromosomes associated with the two superior end product variants could be genetically evolved to generate a set of evolved host chromosome(s) 36. Any type of genetic evolution algorithm could be utilized, including mating, cross-over and mutating. For instance, the recipes of the two superior host chromosomes could be mated, such that elements of one recipe (e.g., a first type of cherries) would be swapped with elements of the other recipe (e.g., a second type of cherries). In another example, a mutation could be employed by incorporating an additional ingredient to an existing recipe (e.g., adding walnuts). Any number of new evolved host chromosome(s) 36 could be created by evolution system 18.

In addition, an updated parasite chromosome 38 can likewise generated. Updated parasite chromosome 38 may for instance include a newly evolved bacteria or an additional parasite that is known to be relevant to an additional, i.e., mutated, ingredient.

Once the new newly evolved host chromosome(s) 36 and updated parasite chromosome 38 are generated, they can be fed back into the production system 14 to generate a new set of end product(s) 28. The process can iterate any number of times until some exit criteria is achieved, e.g., a highly satisfactory end product is attained.

FIG. 2 depicts an illustrative example of a host chromosome 50 and a parasite chromosome 52. Each utilizes a markup language format to encode "recipe" information. For instance, the illustrative host chromosome 50 includes: (1) a name tag for naming the variant; (2) an ingredients tag for listing the ingredients; (3) a production tag for detailing how to produce the product; (4) a packaging tag for detailing how to package the product; and (5) and antibiotics tag for detailing what antibiotics are utilized. The illustrative parasite chromosome 52 details four different parasites and two contaminants. The contaminants include an error rate, i.e., the likelihood of contamination. It is understood that the scope of the invention is not limited to the illustrative embodiment shown in FIG. 2, and any number of different embodiments could be utilized to represent chromosomes.

Figure 3:
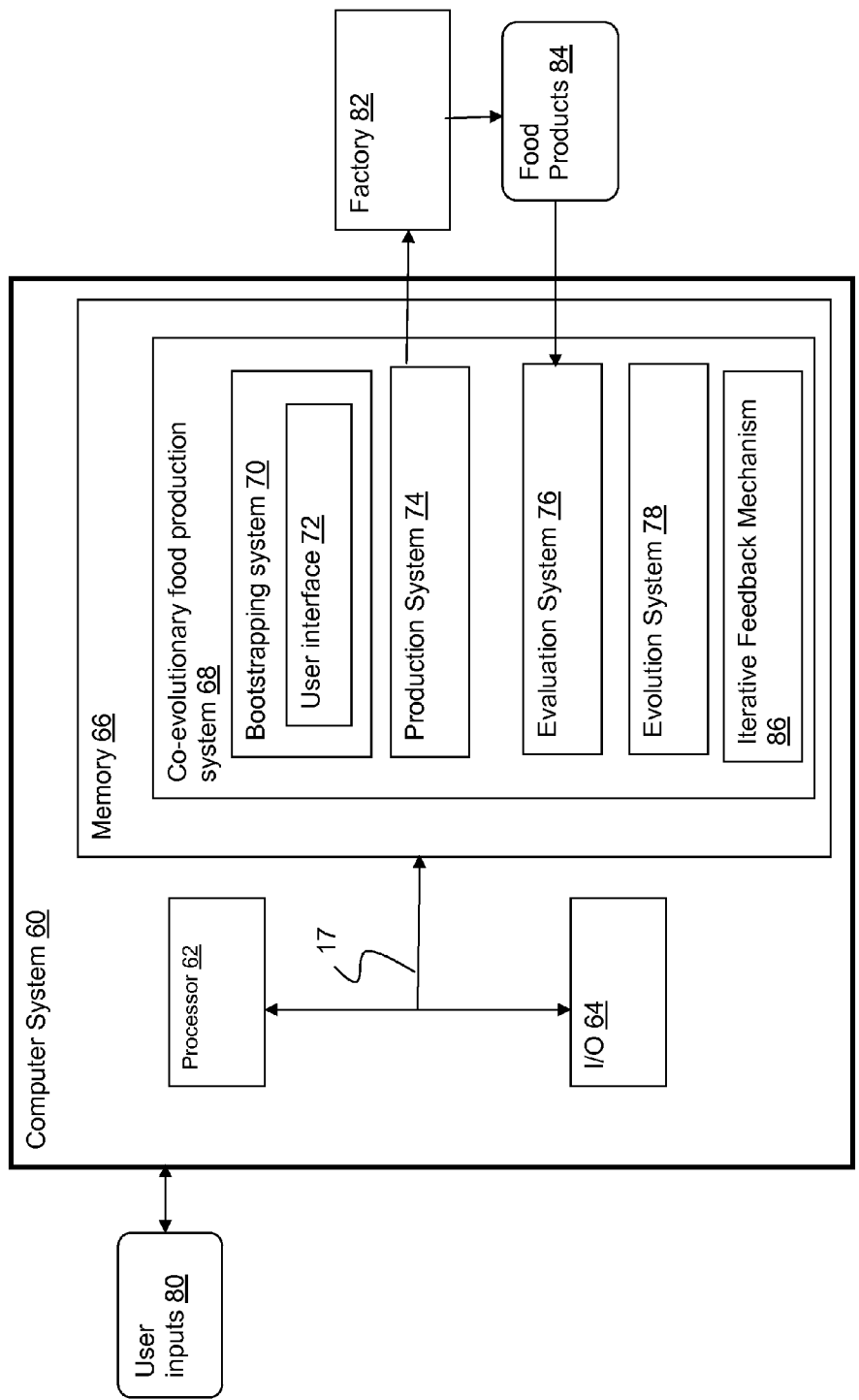
FIG. 3 depicts a computer system in accordance with an embodiment of the invention.

FIG. 3 depicts a computer system 60 for implementing a co-evolutionary food production system 68, which may for example be implemented as a computer program product stored in a memory 66, and executable by processor 62. Co-evolutionary food production system 68 includes a bootstrapping system 70 for generating an initial set of host chromosomes and a parasite chromosome. Bootstrapping system 70 may include a user interface 72 for inputting user inputs 80 that described one or more characteristics or features of a food product. Also included is a production system 74 for generating food products 84 based on inputted host chromosomes. In one embodiment, food products 84 are simulated. In another embodiment, production system 74 is used to control a factory for producing food products 84. An evaluation system 76 is provided to evaluate the food products 84 and an evolution system 78 is provided to genetically evolve the highest performing host chromosomes. An iterative feedback mechanism 86 is then utilized to iterate the processing until an exit criterion is reached.

The following illustrative methods may be employed:

EXAMPLE METHODOLOGY 1

1. Obtain a plurality of product characteristics to produce a feature vector (e.g., specified by a customer)
2. Determine which of the elements of the product characteristic model match those characteristics obtained;
3. Measure the product (rate of change, acceleration, mass, chemical shifts, texture, etc.) and encode into a genetic algorithm representation, i.e., host chromosome;
4. Measure the "parasites" and encode into a genetic algorithm representation, i.e., parasite chromosome;
5. Include a probability of contaminants in the parasite chromosome, e.g., the measured probability 6-sigma of dropping a piece of plastic in the food;

6. Measure the fitness of parasite/host pairs;
7. Perform genetic algorithm actions to produce new chromosomes;
8. Assemble the products and create chromosomes again with an entropy factor, e.g., when to get chemicals that are not in the system; and
9. Continue iterating until exit criterion is reached, e.g., quality is good enough.

Additional features may include:
10. Bootstrapping the genetic algorithm chromosomes with a current product.
11. Using meta-heuristics as a fitness function, e.g., user preferences change which changing fitness functions (as people age they tend to like red wine over white), as new products come available, they need to be accounted for.
12. Taking into account new methods of killing parasites, new understanding of how bacteria will evolve, etc.

EXAMPLE METHODOLOGY 2

1. A set of chromosomes represent ingredients for a product in the form of a feature vector
    a. The feature vector is bootstrapped either from an existing product or from one iteration of a product assembly
2. A set of parasite chromosomes are paired with product chromosome
    a. Parasites/bacteria are found using nuclear magnetic resonance imaging and examining chemical shifts, or any other actual or simulated technique
    b. Contaminants, i.e., potential human or machine errors are identified
    c. The host/parasite paradigm is established
3. Processes or assembly lines decode the product genotype (features)->a phenotype (ingredients)
    a. The host or product chromosome is akin to a recipe and process
    b. Parasite features are measured at the end to encode a parasite chromosome; phenotype->genotype
    c. The chromosomes become diploids where a pair represents a host and a parasite
4. Each diploid is measured with fitness that is translated from a meta heuristic, e.g., user preferences, strength of parasite, etc.
5. The diploids are split into separate chromosomes.
6. The host chromosomes are ranked from good to bad.
7. The chromosomes are crossed over, mated, mutated for new recipes.
8. If an exit criterion is satisfied, the process stops and a recipe has been generated for mass production.
9. Otherwise, keep iterating.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including Instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for enhancing food production, comprising:
    a production system for generating a set of end products based on an inputted set of host chromosomes and a parasite chromosome, wherein the parasite chromosomes include chromosomes of at least one of a parasitic creature or a parasitic substance;
    an evaluation system for evaluating each end product;
    an evolution system for generating a set of evolved host chromosomes and an updated parasite chromosome; and
    a mechanism for generating a further set of end products based on the evolved host chromosomes and the updated parasite chromosome.

2. The system of claim 1, further comprising a bootstrapping system for generating an initial set of host chromosomes and an initial parasite chromosome.

3. The system of claim 2, wherein the bootstrapping system includes a system for processing end user inputs.

4. The system of claim 1, wherein the production system generates parasite data and wherein the evaluation system utilizes the parasite data to evaluate end products.

5. The system of claim 1, wherein the set of end products generated by the production system are one of simulated end products and physical end products.

6. The system of claim 1, wherein the evaluation system ranks end products utilizing at least one of: a fitness factor, consumer testing, a table look-up, and an automated analysis.

7. The system of claim 1, wherein the evolution system utilizes a genetic algorithm that utilizes at least one of: mutating, mating and crossover.

8. The system of claim 1, wherein the evaluation system includes a system for evaluating contaminants entered during a production process.

9. A method for enhancing food production, comprising:
    producing a set of end products based on a set of host chromosomes and a parasite chromosome;
    evaluating each end product;
    generating a set of evolved host chromosomes and an updated parasite chromosome, wherein the parasite chromosomes include chromosomes of at least one of a parasitic creature or a parasitic substance; and
    generating a further set of end products based on the evolved host chromosomes and the updated parasite chromosome.

10. The method of claim 9, further comprising generating an initial set of host chromosomes and an initial parasite chromosome based on end user inputs.

11. The method of claim 9, wherein producing the set of end products includes generating parasite data and wherein evaluating utilizes the parasite data to evaluate end products.

12. The method of claim 9, wherein the set of end products are one of simulated end products and physical end products.

13. The method of claim 9, wherein the evaluating ranks end products utilizing at least one of: a fitness factor, consumer testing, a table look-up, and an automated analysis.

14. The method of claim 9, wherein generating the set of evolved host chromosomes uses a genetic algorithm that includes at least one of: mutating, mating and crossover.

15. The method of claim 9, wherein evaluating includes evaluating contaminants entered during a production process.

16. A computer readable medium having a computer program product stored thereon for enhancing food production, which when executed by a computer system, includes:
    program code for facilitating production of a set of end products based on a set of host chromosomes and a parasite chromosome, wherein the parasite chromosomes include chromosomes of at least one of a parasitic creature or a parasitic substance;
    program code for evaluating each end product;
    program code for generating a set of evolved host chromosomes and an updated parasite chromosome; and
    program code for generating a further set of end products based on the evolved host chromosomes and the updated parasite chromosome.

17. The computer program product of claim 16, further comprising program code for generating an initial set of host chromosomes and an initial parasite chromosome based on end user inputs.

18. The computer program product of claim 16, wherein the program code for facilitating production includes generating parasite data and wherein the program code for evaluating utilizes the parasite data to evaluate end products.

19. The computer program product of claim 16, wherein the set of end products are one of simulated end products and physical end products.

20. The computer program product of claim 16, wherein the program code for evaluating ranks end products utilizing at least one of: a fitness factor, consumer testing, a table look-up, and an automated analysis.

21. The computer program product of claim 16, wherein the program code for generating the set of evolved host chromosomes uses a genetic algorithm that includes at least one of: mutating, mating and crossover.

22. The computer program product of claim 16, wherein the program code for evaluating includes evaluating contaminants entered during a production process.

* * * * *